US008696805B2

(12) United States Patent
Chang et al.

(10) Patent No.: US 8,696,805 B2
(45) Date of Patent: Apr. 15, 2014

(54) HEAT EXCHANGER FOR DEHUMIDIFIER USING LIQUID DESICCANT AND DEHUMIDIFIER USING LIQUID DESICCANT HAVING THE SAME

(75) Inventors: Young Soo Chang, Seoul (KR); Dae-Young Lee, Seoul (KR)

(73) Assignee: Korea Institute of Science and Technology (KR)

( * ) Notice: Subject to any disclaimer, the term of this patent is extended or adjusted under 35 U.S.C. 154(b) by 573 days.

(21) Appl. No.: 12/880,517

(22) Filed: Sep. 13, 2010

(65) Prior Publication Data
US 2011/0073290 A1    Mar. 31, 2011

(30) Foreign Application Priority Data

Sep. 30, 2009 (KR) .......... 10-2009-0093482

(51) Int. Cl.
*B01D 47/00* (2006.01)
(52) U.S. Cl.
USPC ............. 96/243; 165/166; 96/290; 261/112.2
(58) Field of Classification Search
None
See application file for complete search history.

(56) References Cited

U.S. PATENT DOCUMENTS

| 4,434,842 | A * | 3/1984 | Gregory ............... 165/133 |
| 6,854,278 | B2 * | 2/2005 | Maisotsenko et al. ...... 62/94 |
| 2005/0218535 | A1 * | 10/2005 | Maisotsenko et al. ...... 261/153 |
| 2007/0163772 | A1 * | 7/2007 | Bhatti et al. ............ 165/202 |
| 2008/0276640 | A1 * | 11/2008 | Bhatti et al. ............ 62/271 |

FOREIGN PATENT DOCUMENTS

| JP | 2003-114035 | 4/2003 |
| KR | 10-2004-0005108 | 1/2004 |
| KR | 10-2009-0010308 | 1/2009 |

OTHER PUBLICATIONS

Office Action issued by the Korean Patent Office on Apr. 25, 2011 in connection with corresponding Korean Patent Application No. 10-2009-0093482.

* cited by examiner

*Primary Examiner* — Robert Clemente
*Assistant Examiner* — Phillipe Shao
(74) *Attorney, Agent, or Firm* — Ostrolenk Faber LLP

(57) ABSTRACT

Disclosed are a heat exchanger for a dehumidifier using a liquid desiccant and a dehumidifier using a liquid desiccant having the same. The heat exchanger for a dehumidifier using a liquid desiccant, comprises: a plurality of plate-type heat exchanger bodies to which a heat transfer medium flows through flow paths formed therein; and a plurality of plates extending between the respective heat exchanger bodies, and inclined with respect to the surfaces of the heat exchanger bodies.

11 Claims, 6 Drawing Sheets

HEAT EXCHANGER FOR DEHUMIDIFIER USING LIQUID DESICCANT AND DEHUMIDIFIER USING LIQUID DESICCANT HAVING THE SAME

RELATED APPLICATION

The present disclosure relates to subject matter contained in priority Korean Application No. 10-2009-0093482, filed on Sep. 30, 2009, which is herein expressly incorporated by reference in its entirety.

BACKGROUND OF THE INVENTION

1. Field of the Invention

The present invention relates to a heat exchanger for a dehumidifier using a liquid desiccant and a dehumidifier using a liquid desiccant having the same, and particularly, to a dehumidifier capable of absorbing moisture from the air by using a liquid desiccant, and a heat exchanger for the dehumidifier.

2. Background of the Invention

A dehumidifier using a liquid desiccant is an apparatus for obtaining dry air by absorbing moisture from the air by spraying a liquid desiccant having a high concentration to the air. The dehumidifier using a liquid desiccant is configured to be consecutively operated by circulating a liquid desiccant sprayed into the air, an object to be dried. Since the liquid desiccant having absorbed moisture from the air becomes dilute, an absorbing characteristic of the liquid desiccant in the next cycle is lowered. To prevent this, the moisture included in the liquid desiccant is made to be evaporated in a high-temperature atmosphere by re-spraying the liquid desiccant having absorbed the moisture from the high-temperature regeneration air, which is called as a 'regeneration' process. The regeneration process is performed in a regenerator.

In order to enhance dehumidifying efficiency in the dehumidifying process, it is advantageous for the liquid desiccant and the air to which the liquid desiccant is sprayed to have low temperature. Here, it is also advantageous to increase a contact area between the liquid desiccant and the air. On the other hand, in the regeneration process, the liquid desiccant and the air to which the liquid desiccant is sprayed have to have a high temperature, and a contact area therebetween has to be increased. In order to operate the dehumidifier using a liquid desiccant, the air and the liquid desiccant need to be heated (regeneration process), or cooled (dehumidification process). For the regeneration process and the dehumidification process, a heat exchanger is required.

More concretely, the liquid desiccant and the air may be cooled or heated is through heat exchange with a heat transfer medium having a high or low temperature and flowing in the heat exchanger, by spraying the liquid desiccant and the air to the surface of the heat exchanger, and thus by making the liquid desiccant flow along the surface of the heat exchanger. In order to cool or heat a larger amount of liquid desiccant per hour, a larger amount of liquid desiccant has to be supplied. However, in this case, the liquid desiccant may form a thick liquid film on the surface of the heat exchanger, thereby lowering heat and mass transfer coefficient. Furthermore, waves may be formed on the surface of the liquid film, or the liquid desiccant may spread to the air due to the unstable liquid film.

FIG. 1 shows a heat exchanger in accordance with the conventional art. Referring to FIG. 1, the heat exchanger 10 has a structure that a plurality of heat exchanger bodies 12 are arranged in parallel. Cooling water or heating water for heat exchanger flows at an inner space of each of the heat exchanger bodies 12. The inner space is divided into a plurality of channels by partition walls 14. A liquid desiccant is supplied to the heat exchanger 10 along the surfaces of the heat exchanger bodies 12. The liquid desiccant is supplied from the upper side of the heat exchanger bodies 12, and is downwardly moved along the surfaces of the heat exchanger bodies 12 by gravity. And, the air or regeneration air is supplied to a space between the heat exchanger bodies 12.

Since the liquid desiccant and the air is heated or cooled, dehumidifying efficiency or regeneration efficiency may be enhanced. Under these structures, the liquid desiccant has to be uniformly supplied to the heat exchanger 10 along the surfaces of the heat exchanger bodies 12. And, the liquid film has to have a thin thickness so as to increase a heat transfer amount to the air, and to prevent the liquid desiccant from dispersing to the air.

Substantial heat exchange between the liquid desiccant and the air is performed on the surfaces of the heat exchanger bodies 12. This may cause the heat exchanger to have a large size. Furthermore, due to limitations in the thickness of the liquid film, a heat transfer amount per hour may be reduced.

SUMMARY OF THE INVENTION

Therefore, an object of the present invention is to provide a heat exchanger for a dehumidifier using a liquid desiccant, the heat exchanger capable of having a small size by increasing heat transfer efficiency.

Another object of the present invention is to provide a dehumidifier using a liquid desiccant having the heat exchanger, the dehumidifier capable of reducing the size of an entire system.

To achieve these and other advantages and in accordance with the purpose of the present invention, as embodied and broadly described herein, there is provided a heat exchanger for a dehumidifier using a liquid desiccant, the heat exchanger comprising: a plurality of plate-type heat exchanger bodies to which a heat transfer medium flows through flow paths formed therein; and a plurality of plates extending between the respective heat exchanger bodies, and inclined with respect to the surfaces of the heat exchanger bodies.

The heat exchanger may further comprise plates which provide an extended surface between the heat exchanger bodies so as to increase a contact area between air and a liquid desiccant. The plates may be inclined such that a liquid desiccant supplied thereto flow along their surfaces, thereby increasing a contact area between the liquid desiccant and the air.

Each of the plates may be provided with a plurality of through holes, and the liquid desiccant may be supplied to the surface of the heat exchanger body or the lower plate via the through holes.

Each of the plates may be arranged in the form of a zigzag when viewed from a side surface of the heat exchanger body. This may allow the liquid desiccant to sequentially flow down along the respective plates.

The plates may be formed of a non-woven fabric, e.g., a Polyethylene Telephthalate (PET) non-woven fabric.

In order to reduce a thickness of the liquid desiccant on the surface of the plate, the plate may be hydrophilic surface-coated. And, the heat exchanger body may be surface-treated for enhanced wet property.

At least one of the thorough holes may be configured such that its edge does not contact the heat exchanger body. The through holes not contacting the heat exchanger body may supply the liquid desiccant on the surface of the upper plate to the lower plate.

Some of the through holes may be formed at contact points between the plates and the heat exchanger body. These through holes may transfer the liquid desiccant supplied onto the surface of the plate to the heat exchanger body.

According to another aspect of the present invention, there is provided a heat exchanger for a dehumidifier using a liquid desiccant, the heat exchanger comprising: a plurality of plate-type heat exchanger bodies to which a heat transfer medium flows through flow paths formed therein; and a folded plate arranged between the heat exchanger bodies, and having a plurality of inclined surfaces arranged in a zigzag form, wherein each of the inclined surfaces is provided with first through holes for transferring a liquid desiccant flowing on the inclined surface to a lower side, and second through holes for transferring a liquid desiccant flowing on the inclined surface to a surface of the heat exchanger body.

The folded plate may be formed of a polyester (PET) non-woven fabric.

The folded plate may be surface-treated for enhanced wet property.

The first through holes may be arranged away from the edge of the folded plate, and the second through holes may be configured such that the second through holes contact both the inclined surfaces and the heat exchanger body.

According to still another aspect of the present invention, there is provided a heat exchanger for a dehumidifier using a liquid desiccant, the heat exchanger comprising: a plurality of plate-type heat exchanger bodies to which a heat transfer medium flows through flow paths formed therein; and a folded plate arranged between the heat exchanger bodies, and having a plurality of inclined surfaces arranged in a zigzag form, wherein each of the inclined surfaces is provided with a plurality of through holes for transferring a liquid desiccant flowing on the inclined surface to a lower side, and wherein the plate-type heat exchanger body is provided with one or more channels configured to collect part of the liquid desiccant flowing down along the inclined surfaces.

The channel may serve as the second through holes, and mix the liquid desiccant flowing down along the inclined surface with the liquid desiccant flowing down along the surface of the heat exchanger body for heat exchange therebetween. And, the channels may transfer some of the liquid desiccant to the surface of the heat exchanger body.

The through holes may be arranged away from the edge of the folded plate.

The channel may be arranged so as to extend to upper and lower sides of both ends of the folded plate.

The channel may be arranged in parallel in a width direction of the plate-type heat exchanger bodies.

The channel may be configured to have a circular or polygonal sectional surface.

To achieve these and other advantages and in accordance with the purpose of the present invention, as embodied and broadly described herein, there is also provided a dehumidifier using a liquid desiccant, the dehumidifier comprising a heat exchanger configured to cool or heat a liquid desiccant and external air, wherein the heat exchanger is implemented as one of the provided heat exchangers.

In the present invention, due to an extended surface where the liquid desiccant and the air contact with each other, a heat exchange amount in the same area may be increased. This may reduce the entire volume of the heat exchanger.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Hereinafter, a dehumidifier using a liquid desiccant according to the present invention will be explained in more detail with reference to the attached drawings.

Figure 1:
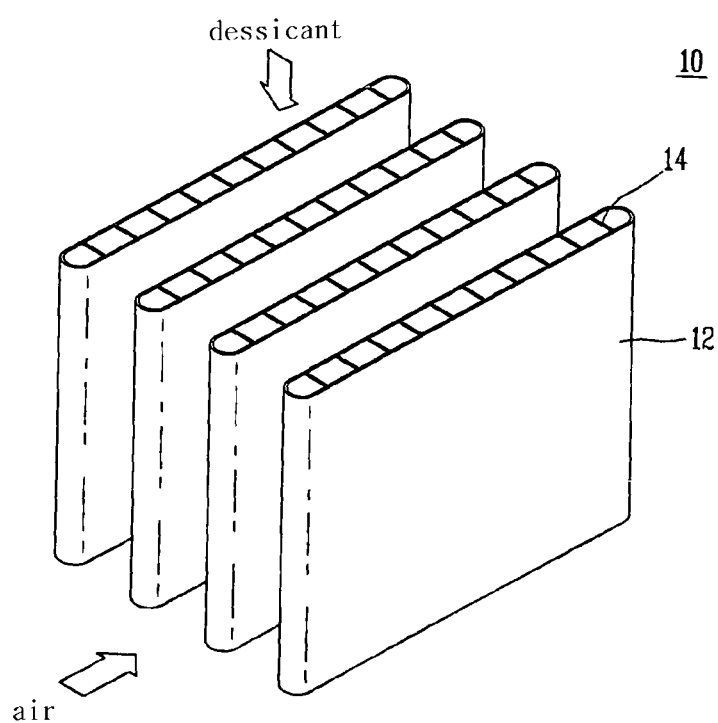
FIG. 1 shows a heat exchanger in accordance with the conventional art.
Figure 2:
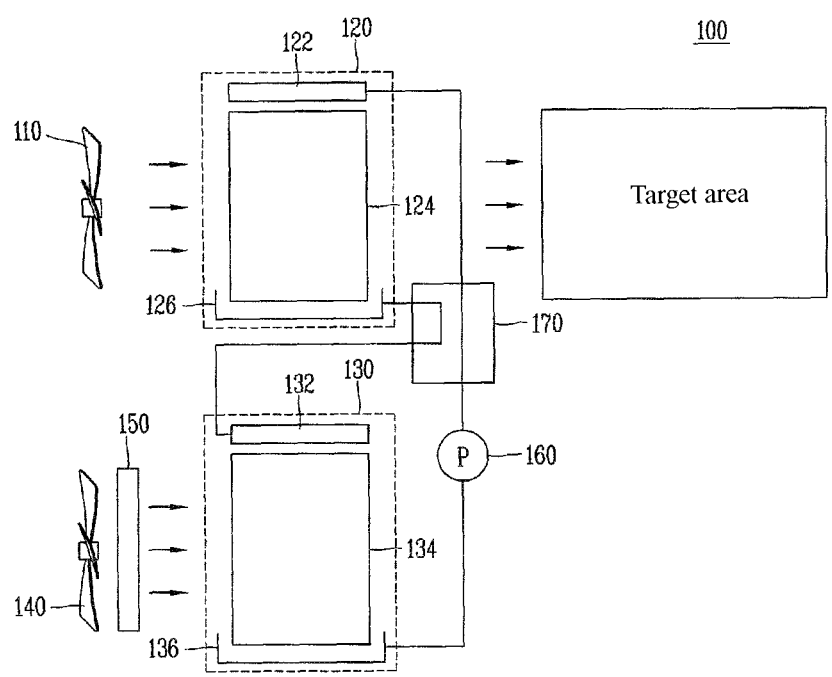
FIG. 2 is a view schematically showing one example of a dehumidifier using a liquid desiccant according to the present invention.

FIG. 2 is a view schematically showing one example of a dehumidifier using a liquid desiccant according to the present invention.

Referring to FIG. 2, the dehumidifier using a liquid desiccant 100 according to the present invention comprises a first blow fan 110 configured to suck external air and to supply the air into a system. And, the external air sucked by the first blow fan 110 is blown to a first heat and mass exchange module 120. The first heat and mass exchange module 120 serves to remove moisture from the external air by contacting the external air with the liquid desiccant. An upper header 122 is disposed at an upper side of the first heat and mass exchange module 120, and a first heat exchanger 124 is disposed at a lower side of the upper header 122. The external air having passed through the first heat and mass exchange module 120 is dehumidified to have low humidity by the liquid desiccant, and is transferred to an indoor room.

The liquid desiccant having been supplied to the first heat exchanger 124 from the upper header 122 contacts the sucked external air while flowing along the surface of the first heat exchanger 124, thereby absorbing moisture from the external air. The liquid desiccant and the external air are cooled due to heat exchange with cooling water supplied into the first heat exchanger 124. This may enhance dehumidifying efficiency. As the cooling water, cooling water from an external water source, or cooling water cooled by an additional cooling device, etc. may be used.

The liquid desiccant having passed through the first heat exchanger 124 is collected to a lower header 126 disposed below the first heat exchanger 124. Then, the collected liquid desiccant is supplied to an upper header 132 of a second heat and mass exchange module 130. The second heat and mass is exchange module 130 serves to dry the liquid desiccant containing moisture by the first heat and mass exchange module 120 for an enhanced absorbing characteristic. The second heat and mass exchange module 130 includes a second heat exchanger 134 which is the same as the first heat exchanger 124.

A second blow fan 140 configured to supply hot blast to the second heat exchanger 134 is arranged so as to be adjacent to the second heat exchanger 134. A heater 150 configured to heat air is arranged between the second blow fan 140 and the second heat exchanger 134. The supplied blast contacts the liquid desiccant on the second heat and mass exchange module 130, thereby drying the liquid desiccant. Differently from the first heat exchanger 124, the second heat exchanger 134 is supplied with hot water to accelerate evaporation of moisture. The liquid desiccant having passed through the second heat exchanger 134 is collected to a lower header 136 disposed below the second heat exchanger 134, and is transferred to the upper header 122 by a pump 160. Here, a regeneration heat exchanger 170 may be additionally installed to enhance thermal efficiency by allowing heat exchange to be performed between the circulating liquid desiccants. That is, heat exchange is performed between the liquid desiccant moving from the first heat and mass exchange module to the second heat and mass exchange module, and the liquid desiccant moving in the opposite direction in the regeneration heat exchanger 170, thereby reducing energy required to cool or heat the liquid desiccants.

Figure 3:
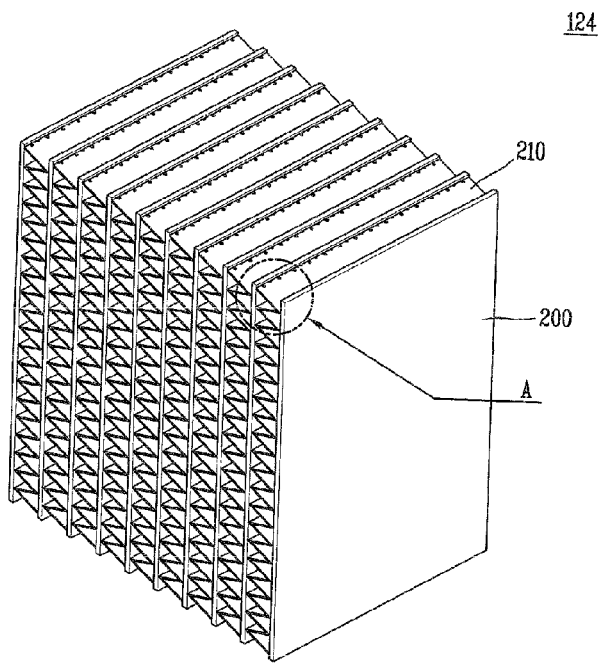
FIG. 3 is a perspective view of a heat exchanger of FIG. 2.

FIG. 3 shows a structure of the first heat exchanger 124. Since the second heat exchanger 134 has the same structure as the first heat exchanger 124, its detailed explanations will be omitted.

The first heat exchanger 124 comprises a plurality of heat exchanger bodies 200 arranged in parallel. Cooling water supplied from the outside flows into the heat exchanger bodies 200 in a length direction of the heat exchanger bodies 200. The cooling water is heat-exchanged with the liquid desiccant or air disposed on the surfaces of the heat exchanger bodies 200, thereby cooling the liquid desiccant or the air. The heat exchanger bodies 200 are formed of a corrosion resistance material capable of enduring high corrosion of the liquid desiccant. In the preferred embodiment, the heat exchanger bodies 200 are formed of polypropylene (PP) plastic.

A folded plate 210 is arranged between the heat exchanger bodies 200 so as to extend a heat exchange area. The folded plate 210 is configured by folding one plate in a zigzag form, and is formed of a polyester (PET) non-woven fabric. Under these structures, some of the liquid desiccant supplied to a lower side of the heat exchanger 124 from the upper header 122 flow along the surfaces of the heat exchanger bodies 200, and other parts thereof flow down along the folded plate 210. Here, both lateral edges of the folded plate 210 are arranged so as to come in contact with the heat exchanger bodies 200.

Figure 4:
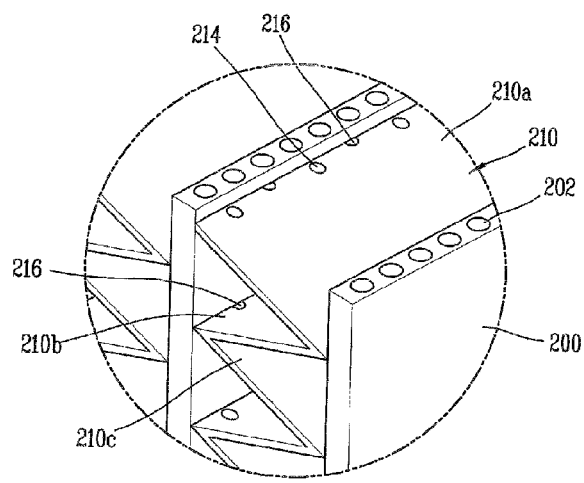
FIG. 4 is an enlarged perspective view of a part of FIG. 3.

Accordingly, the supplied liquid desiccant temporarily stays at an uppermost plate 210a of FIG. 4, and then is downwardly moved due to an inclined surface of the plate 210a. Then, the liquid desiccant stays between the right heat exchanger body 200 and the inclined surface in FIG. 3. The liquid desiccant having flown down along the heat exchanger body 200 is cooled due to heat exchanger with the heat exchanger body 200, and stays between the surface of the plate 210a and the surface of the heat exchanger body 200. Accordingly, the liquid desiccant having passed through the plate 210a is mixed with the liquid desiccant having passed through the heat exchanger body 200 near the lateral end of the plate 210a, thereby having a lowered temperature.

Figure 5:
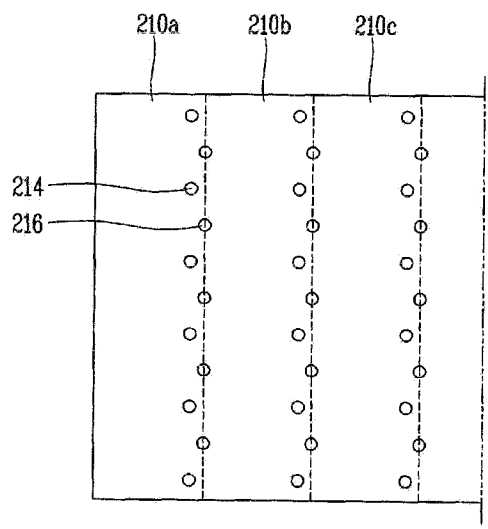
FIG. 5 is an unfolded view of a folded plate of FIG. 3.

Then, the liquid desiccant is transferred to the lower side of the heat exchanger 124 via first and second through holes of the folded plate 210. Referring to FIGS. 4 and 5, the first through holes 214 are arranged away from both lateral edge of the folded plate, whereas the second through holes 216 are arranged on a boundary between the inclined surfaces.

Some of the liquid desiccant flow down via the first through holes 214, and others flow down via the second through holes 216. Since the first through holes 214 are arranged away from the edge of the inclined surface, the liquid desiccant having passed through the first through holes 214 is transferred to a lower plate. On the other hand, since the second through holes 216 are formed on a boundary between the inclined surface, the liquid desiccant having passed through the second through holes 216 is transferred to the lower side along the surface of the heat exchanger body 200.

As shown in FIG. 4, the first through holes 214 are disposed at the upper side, whereas the second through holes 216 are disposed at the lower side. This may allow the liquid desiccant to be alternately transferred to the surfaces of the heat exchanger body and the plate for smooth mixture between the liquid desiccants.

In the preferred embodiment, the folded plate is formed to constitute a single incorporated structure. However, the present invention is not limited to this. For instance, a plurality of plates may be arranged in a non-connected state.

For uniform and thin liquid films of the liquid desiccant on the surfaces of the heat exchanger body and the folded plate, the heat exchanger body may be surface-treated for enhanced wet property, and the folded plate may be hydrophilic surface-coated.

Figure 6:
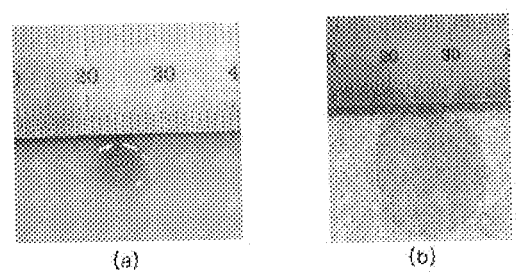
FIG. 6 is a photo showing a state that a liquid desiccant is formed on the surface of the heat exchanger of FIG. 3.

FIG. 6 is a photo showing a state that the liquid desiccant is formed on the surface of the heat exchanger body of FIG. 3. More concretely, (a) shows the heat exchanger body having not been surface-treated for enhanced wet property, whereas (b) shows the heat exchanger body having been porous surface-treated for enhanced wet property. As shown in (b), the liquid desiccant is distributed on a wider area when the heat exchanger body has been porous surface-treated for enhanced wet property.

Figure 7:
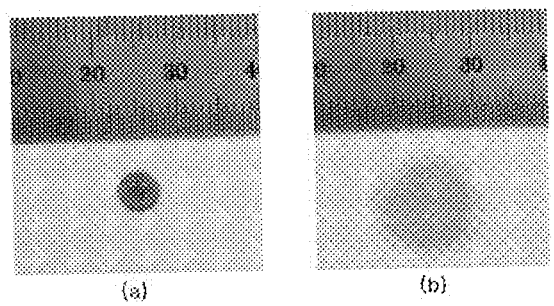
FIG. 7 is a photo showing a state that a liquid desiccant is formed on the surface of the folded plate of FIG. 3.

FIG. 7 is a photo showing a state that the liquid desiccant is formed on the surface of the folded plate. More concretely, (a) shows a state that the folded plate has not been hydrophilic surface-coated, whereas (b) shows a state that the folded plate has been hydrophilic surface-coated. As shown in (b), the liquid desiccant is distributed on a wider area when the folded plate has been hydrophilic surface-coated.

Figure 8:
FIG. 8 is a photo showing that a liquid desiccant flows in the heat exchanger of FIG. 3.

FIG. 8 is a photo showing an experimental result about whether the liquid desiccant uniformly flows to the heat exchanger body and the folded plate. More concretely, flowing of a liquid mixture consisting of water and flavin fluorescence was observed by irradiating ultraviolet rays onto the liquid mixture. As shown in FIG. 8, it can be seen that the mixture liquid is uniformly distributed onto the entire surfaces of the folded plate and the heat exchanger body while flowing down.

Figure 9:
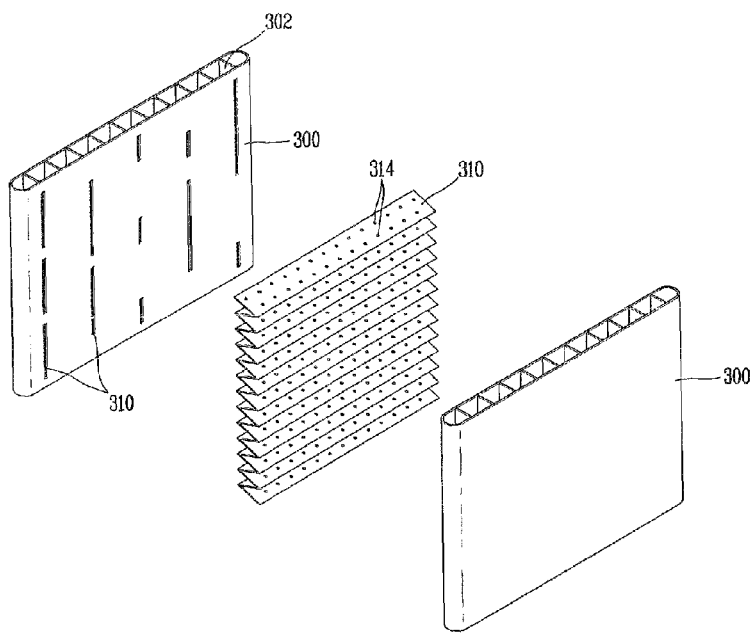
FIG. 9 is a exploded perspective view of a heat exchanger according to another embodiment of the present invention.

FIG. 9 is a exploded perspective view of a heat exchanger according to another embodiment of the present invention.

Referring to FIG. 9, a plurality of flow paths 302 are formed in a heat exchanger body 300, and a heat transfer medium flows through the flow paths 302. A plurality of channels 304 having different lengths are formed on the surface of the heat exchanger body 300. Each of the channels 304 has a rectangular section, and is extending in upper and lower directions of the heat exchanger body 300. However, the channels 304 are configured to have various lengths. The channels 310 may have circular or other polygonal sections rather than the rectangular sections.

The plurality of channels 304 are arranged in parallel in a width direction of the heat exchanger body 300. As shown, the channels 304 may be non-consecutively arranged in a length direction of the heat exchanger body 300, or may be consecutively arranged.

The folded plate 310 is provided with a plurality of first through holes 314 such that the liquid desiccant disposed on an inclined surface of an upper plate is transferred to an inclined surface of a lower plate. The first through holes 3114 may be arranged away from both ends of the folded plate 310, or may be disposed at a central portion of the folded plate 310.

Figure 10:
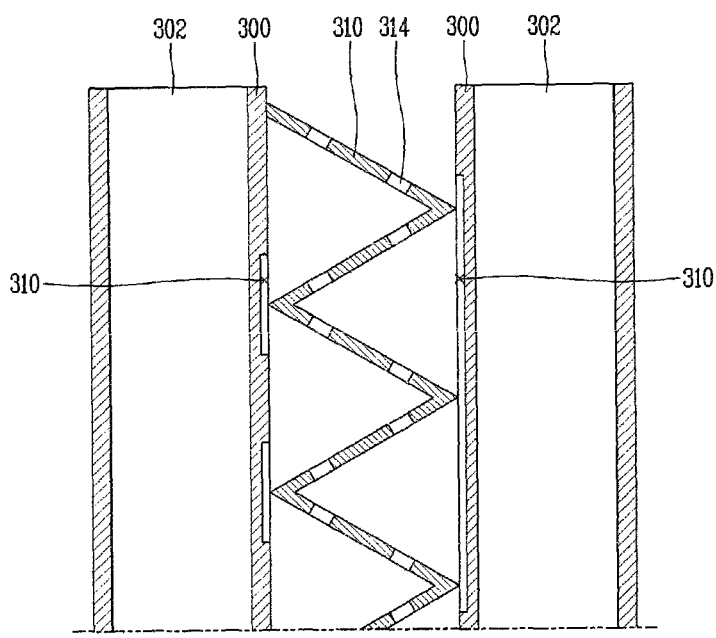
FIG. 10 is a sectional view of the heat exchanger of FIG. 9.

FIG. 10 is a sectional view of the heat exchanger of FIG. 9.

Referring to FIG. 10, the channels 304 are arranged such that the edges of the inclined surfaces of the folded plate 310 are disposed on the surfaces of the channels 304. Under these structures, the liquid desiccant having been transferred to the surface of the heat exchanger body without passing through the first through holes 314 is made to flow along the surface of the heat exchanger body through the channels 304. That is, the channels 304 serve as the aforementioned second through holes.

Besides, a lower end of the channel 304 may be disposed between the inclined surfaces. This may allow the liquid desiccant to be discharged from the channel 304 to uniformly contact the surface of the heat exchanger body. Accordingly, heat exchange efficiency may be enhanced.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A heat exchanger for a dehumidifier using a liquid desiccant, the heat exchanger comprising:
    a plurality of plate-shaped heat exchanger bodies to which a heat transfer medium flows through flow paths formed therein;
    a plurality of plates extending between the respective heat exchanger bodies, and inclined with respect to surfaces of the heat exchanger bodies;
    an upper header supplying the liquid desiccant to the plurality of plates;
    a lower header collecting the liquid desiccant from the plurality of plates; and
    a blow fan supplying air to the plurality of plates;
    wherein each of the plates is provided with a plurality of through holes for passing a fluid flowing along the surface of the plate to a lower side of the plate,
    wherein the plurality of plates provide surfaces, which the desiccant and blown air contact each other, and
    wherein each of the plates is formed of a polyester (PET) non-woven fabric.

2. The heat exchanger of claim 1, wherein each of the plates is arranged in the form of a zigzag when viewed from a side surface of the heat exchanger body.

3. The heat exchanger of claim 1, wherein the heat exchanger body is surface-treated for enhanced wet property.

4. The heat exchanger of claim 1, wherein each of the plates are hydrophilic surface-coated.

5. The heat exchanger of claim 1, wherein at least one of the thorough holes are arranged away from the both edges of the plates.

6. The heat exchanger of claim 5, wherein some of the through holes are formed at contact points between the plates and heat exchanger body.

7. A heat exchanger for a dehumidifier using a liquid desiccant, the heat exchanger comprising:
    a plurality of plate-shaped heat exchanger bodies to which a heat transfer medium flows through flow paths formed therein;
    a folded plate arranged between the heat exchanger bodies, and having a plurality of inclined surfaces arranged in a zigzag form
    an upper header supplying a liquid desiccant to the folded plate;
    a lower header collecting the liquid desiccant from the folded plate; and
    a blow fan supplying air to the folded plate;
    wherein each of the inclined surfaces is provided with a plurality of through holes for transferring a liquid desiccant flowing on the inclined surface to a lower side,
    wherein the folded plate provides surfaces on which the desiccant and blown air contact each other,
    wherein the plate-shaped heat exchanger body is provided with one or more channels configured to collect part of the liquid desiccant flowing down along the inclined surface, and
    wherein the folded plate is formed of a polyester (PET) non-woven fabric.

8. The heat exchanger of claim 7, wherein the through holes are arranged away from both edge of the folded plate.

9. The heat exchanger of claim 7, wherein the channel is arranged so as to be extending to upper and lower sides of both ends of the folded plate.

10. The heat exchanger of claim 9, wherein the channel is arranged in parallel to each other.

11. The heat exchanger of claim 7, wherein the channel is configured to have a circular or polygonal sectional surface.

* * * * *